United States Patent [19]

Kirmanen et al.

[11] Patent Number: 5,585,038

[45] Date of Patent: *Dec. 17, 1996

[54] CONDUCTIVE PLASTICS MATERIAL AND A METHOD FOR ITS PREPARATION

[75] Inventors: Pauli Kirmanen, Porvoo; Esko Savolainen, Hollola; Esa Virtanen; Toivo Kärnä, both of Porvoo; Jukka Laakso, Helsinki; Heikki Ruohonen, Helsinki; Kimmo Väkiparta, Helsinki; Olli Ikkala, Helsinki; Hannele Järvinen, Vantaa, all of Finland

[73] Assignee: Neste Oy, Espoo, Finland

[ * ] Notice: The term of this patent shall not extend beyond the expiration date of Pat. No. 5,531,932.

[21] Appl. No.: 253,904

[22] Filed: Jun. 3, 1994

[30] Foreign Application Priority Data

Jun. 4, 1993 [FI] Finland ................................ 932557
Jun. 4, 1993 [FI] Finland ................................ 932578

[51] Int. Cl.⁶ ........................... H01B 1/00; H01B 1/04
[52] U.S. Cl. ........................ 252/500; 252/518; 252/519; 252/520; 252/521; 528/422; 264/104; 264/239
[58] Field of Search ............................... 252/500, 518, 252/519, 520, 521; 528/422; 264/104, 239

[56] References Cited

U.S. PATENT DOCUMENTS

| | | | |
|---|---|---|---|
| 3,963,498 | 6/1976 | Trevoy | 96/87 A |
| 4,025,463 | 5/1977 | Trevoy | 252/500 |
| 4,983,322 | 1/1991 | Elsenbaumer | 252/500 |
| 5,006,278 | 4/1991 | Elsenbaumer | 252/500 |
| 5,171,478 | 12/1992 | Han | 252/500 |
| 5,176,851 | 1/1993 | Barry, Jr. | 252/500 |
| 5,232,631 | 8/1993 | Cao et al. | 252/500 |
| 5,279,769 | 1/1994 | Kokkonen et al. | 252/500 |
| 5,340,499 | 8/1994 | Karna et al. | 252/500 |

FOREIGN PATENT DOCUMENTS

| | | |
|---|---|---|
| 0298746 | 1/1989 | European Pat. Off. . |
| 0545729 | 6/1993 | European Pat. Off. . |
| 0582919 | 2/1994 | European Pat. Off. . |
| 8901694 | 2/1989 | WIPO . |
| WO90/01775 | 2/1990 | WIPO . |
| 9010297 | 9/1990 | WIPO . |
| 9013601 | 11/1990 | WIPO . |

*Primary Examiner*—Paul Lieberman
*Assistant Examiner*—M. Kopec
*Attorney, Agent, or Firm*—Birch, Stewart, Kolasch & Birch, LLP

[57] ABSTRACT

The invention relates to a conductive polymer complex which contains a polyaniline or derivative thereof doped with a protonic acid. By the method according to the invention, a conductive polymer is obtained having substantially reduced acidity, sufficiently high conductivity level, and which is suitable, for example, for being melt processed in conventional plastics processing apparatus. The acidity of the conductive polymer can be reduced by having the conductive polymer contain both a metal compound and an additionally neutralizing compound. The obtained conductive polymer material, having a pH value of approximately 3–8, can be mixed with an insulating polymer to produce a conductive plastics mixture. The invention also relates to a method of preparing a conductive polymer that is more processable by incorporating therein a plasticizing agent selected from the group consisting of water, a $C_1$–$C_3$ alcohol, and mixtures thereof.

40 Claims, No Drawings

CONDUCTIVE PLASTICS MATERIAL AND A METHOD FOR ITS PREPARATION

BACKGROUND OF THE INVENTION

1. Field of the Invention

The present invention relates to an electrically conductive polymer material which contains a polyaniline or derivative thereof doped with a protonic acid, and a method for its production. By the method according to the invention, a conductive polymer material is obtained having substantially reduced acidity, sufficiently high conductivity, and which is suitable, for example, for melt-processing in conventional plastics processing apparatus.

2. Description of the Related Art

Electrically conductive polymers are at present subject to great interest in different parts of the world. These polymers can be used for replacing metal conductors and semiconductors in a number of applications, such as batteries, sensors, switches, light cells, circuit boards, heating elements, electrostatic discharge elimination (ESD), and electromagnetic interference shielding (EMI). The advantages of conductive polymers over metals include their light weight, mechanical properties, corrosion resistance, and less expensive synthesis and processing methods.

Electrically conductive plastics can be divided roughly into two categories: filled conductive plastics, in which a conductive filler, such as carbon black or soot, carbon fiber, metal powder, etc., is added to a thermosetting or thermoplastic resin, and intrinsically conductive plastics, which are based on polymers which have been rendered electrically conductive by oxidation, reduction or protonation (doping).

The electrical conductivity of filled conductive polymers is dependent on mutual contacts between the conductive filler particles. Usually a well dispersed filler is needed in amounts of approximately 10–50 wt. % to produce composites having a good conductance. However, such conductive composites involve problems: their mechanical and certain of their chemical properties are crucially impaired as the filler content increases and the polymer content decreases; their conductivity is difficult to control, especially within the semiconductor range; and stable and homogenous dispersing of the filler into the matrix plastic is difficult.

Intrinsically conductive plastics can be prepared from organic polymers containing long conjugated chains formed by double bonds and heteroatoms. The polymers can be rendered conductive by modifying the π- and π-p-electron systems in their double bonds and heteroatoms by adding to the polymer certain blending or doping agents which will serve as electron receptors or electron donors in the polymer. Thereby electron holes or extra electrons are formed in the polymer chain, enabling electric current to travel along the conjugated chain.

An advantage of the intrinsically conductive plastics is the ease of varying their conductivity as a function of the amount of the doping agent, i.e. the degree of doping, especially within low conductivity ranges. On the other hand, achieving low conductivities with filled conductive plastics is difficult. Examples of currently known intrinsically conductive polymers include polyacetylene, poly-p-phenylene, polypyrrole, polythiophene and its derivatives, and polyaniline and its derivatives.

There are two principal methods for processing polymers into the desired pieces, fibers, films, etc., i.e. melt processing and solution processing. Melt processing is a versatile processing method, whereas solution processing is suitable mainly for the preparation of fibers and films but not profiled pieces. However, the processing and doping of most intrinsically conductive polymers involve problems with respect to the handling, stability, homogeneity, etc., of the materials.

Polyaniline, with its derivatives, is in particular a technically and commercially promising intrinsically conductive polymer. An aniline polymer or a derivative thereof is made up of aniline monomers or derivatives thereof, the nitrogen atom of which is bonded to the para-carbon of the benzene ring of the subsequent unit. Unsubstituted polyaniline may appear in a number of forms, including leucoemeraldine, protoemeraldine, emeraldine, nigraline, and toluprotoemeraldine forms. For conductive polymer applications, the emeraldine form is generally used, having the formula

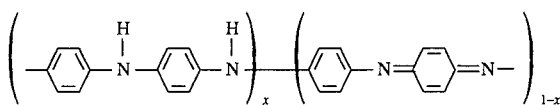

wherein X is approximately 0.5.

According to state-of-the-art technology, the doping of polyaniline is usually carried out by using protonic acids, which include HCl, $H_2SO_4$, $HNO_3$, $HClO_4$, $HBF_4$, $HPF_6$, HF, phosphoric acids, sulfonic acids, picrinic acid, n-nitrobenzoic acid, dichloroacetic acid, and polymer acids. Preferably the doping is carried out using sulfonic acid or its derivatives, such as dodecylbenzenesulfonic acid (DBSA). The protonization is focused on the iminic nitrogen atoms in the aniline units according to the formula presented above, which comprise approximately 50% of the N atoms of polyaniline. Examples of publications in the field include U.S. Pat. Nos. 3,963,498, 4,025,463, and 4,983,322, which are hereby incorporated by reference. The doping of polyaniline with protonic acids is also widely discussed in the literature in the field. U.S. Pat. No. 5,171,478, which is hereby incorporated by reference, discloses a method for increasing the molar mass of polyaniline by heating the polyaniline until its viscosity has increased.

U.S. Pat. No. 5,232,631, Which is hereby incorporated by reference, discloses processible polyaniline compositions and blends that exhibit much lower percolation thresholds, sometimes even below 1% w/w, of conductive polyaniline. The patent relates to conductive polymers and particularly to the use of functionalized protonic acids to induce processibility of electrically conductive polyanilines, and to induce solubility of electrically conductive polyanilines in organic liquids or fluid (melt) phases of solid polymers.

However, the processing a doped polyaniline having good conductivity properties by versatile melt-processing methods has involved problems, to which solutions have been sought. The mixture of polyaniline or a derivative thereof and a doping protonic acid is an indefinite, staining, strongly corrosive, viscous, fluid or paste-like, dispersion-type material which is difficult to handle. A significant improvement to the preparation of a polyaniline-based, melt-processable conductive polymer having good conductivity and other properties is disclosed in EP Patent Application 545729, which is hereby incorporated by reference. According to the invention disclosed in the said Application, a solid, electrically conductive plastics material with good properties is obtained by first contacting the polyaniline or a derivative thereof with a doping protonic acid and by thereafter heat-treating the reaction product or mixture at a temperature of approximately +40° to +250° C. The heat treatment results in a change of the above-described preprotonized mixture of polyaniline or a derivative thereof and a doping protonic acid, from a mixture that is difficult to handle into a homogenous, solid, relatively inert powder or granular material that is easy to handle and is suitable for use in, for example, various melt processing methods.

Polyaniline doped with a functionalized protonic acid has proved to be especially usable when it contains an excess of the protonic acid, such as the above-mentioned sulfonic acid or a derivative thereof, i.e. the mixture contains an amount of acid not only sufficient for the doping, but also for the plasticization of the mixture. When protonic acid is used in this manner in excess, effective doping of polyaniline is obtained and, additionally, the doped polyaniline becomes a material suitable for melt processing, since the protonic acid plays the above-mentioned two roles in the mixture. When protonic acid is used in this manner in excess, the result is a doped polyaniline which has an acidic pH value. However, acidity encumbers the use of the conductive polymer in most applications. In addition to acidic products corroding and contaminating other composite plastics components and the environment, acidic material to be processed damages the equipment, such as melt-processing apparatus, by corroding it. These disadvantages result in few practical applications for an otherwise good conductive material.

State-of-the-art publications have almost completely overlooked the problem of acidity. On the other hand, it is evident in the state of the art that mere mixing together of a polyaniline of the emeraldine base form and a doping agent such as dodecylbenzenesulfonic acid will not suffice to produce a homogenous mixture; the result is the above-mentioned mixture or dispersion which is difficult to handle. In state-of-the-art publications, sufficient mixing and doping has in general been effected by dissolving the parts of the mixture in the same solvent. An example of the state-of-the-art publications concerning this is U.S. Pat. No. 5,006,278, which is hereby incorporated by reference. In addition, the methods disclosed in the state-of-the-art publications in general use solution processing, cf. WO Patents 8901694 and 9013601, in which case the acidity problem will not cause as much harm as in melt processing methods for which the polyaniline-based conductive material according to the present invention is especially suitable. In addition, it can be stated that acidity is not especially problematic in all applications, such as accumulators and batteries.

One way of improving the processibility and of reducing the acidity of a conductive Polymer material which contains polyaniline doped with a protonic acid, preferably sulfonic acid and most preferably dodecylbenzenesulfonic acid, is disclosed in EP Patent Application 582919, which is hereby incorporated by reference. According to the method disclosed in this publication, a certain additive is used for the neutralization of polyaniline or its derivative doped with a protonic acid, and also for its plasticization and/or stabilization. According to the method of this publication, a mixture containing polyaniline doped with a protonic acid can be rendered more plastic, more stable and more neutral by adding to the mixture a metal compound or by treating the doped polyaniline with a metal compound. The metal compound can be selected from among numerous alternatives, according to the desired property to be emphasized. The compounds may be oxides, hydroxides, halides, or equivalent.

In the invention disclosed, it is noted that the most advantageous are the compounds of zinc, of which zinc oxide (ZnO) has been found to be the most suitable. According to a preferred embodiment, the metal compound is allowed to react first with any acid which, together with the metal compound, forms a compound which substantially stabilizes and plasticizes doped polyaniline. The acid reacting with the metal compound need not be the same as the protonic acid to be used for the doping of polyaniline. However, using as the acid reacting with the metal compound the same protonic acid as is used for the doping of the polyaniline has proved to be a preferred embodiment. The mixing of the ingredients is carried out preferably in a melt mixing apparatus, for example by means of a kneader, a compounder, or a screw mixer, at a temperature of approximately 50°–200° C. However, this method has the disadvantage that a metal compound of the type disclosed therein will strongly decrease the conductivity of polyaniline at higher concentrations of the metal compound.

SUMMARY OF THE INVENTION

An object of the present invention is to prepare a conductive polymer material which contains a polyaniline, preferably of the emeraldine form, doped with a protonic acid, preferably sulfonic acid, most preferably dodecylbenzenesulfonic acid, the acidity of the conductive polymer having been substantially reduced, i.e. to a pH range above 2, preferably to a pH range of 3–8, and most preferably to a pH range of 5–7, the conductivity of the polymer nevertheless remaining at a sufficiently high level. The conductivity remaining at a sufficiently high level in spite of the neutralization treatment is a significant improvement over the neutralization method according to the above-mentioned EP application 582919.

By the method of the present invention, a significant improvement is achieved over the method disclosed in the above-mentioned publication with respect to the pH range also, so that the adjustability of the pH value becomes possible even within a low pH range, without affecting the conductivity of the polymer. It has been shown that if only a metal compound, such as zinc oxide, is used together with an acid, the result may be, in spite of stoichiometric proportions of the ingredients, too acidic a product, the acidity of which can now be substantially reduced by the method according to the present invention. It is a further advantage of the method according to the present invention that the final product obtained will be of a more uniform acidity than the product obtained by the method according to the publication mentioned above.

The above-mentioned advantageous acidity limits (pH 3–8) achievable by the method according to the invention can, however, be further widened for certain specialized applications. For certain purposes, conductive plastics mixtures having a pH even below 3 or above 8 can be used, and such plastics mixtures can be obtained by a suitable selection of the matrix polymers to be mixed with the conductive polymer material.

The conductive polymer composition according to the present invention thus has wider areas of use than prior art conductive polymer compositions. Owing to the consistently and substantially higher pH range of the composition, it is considerably more suitable for use in various processing apparatus than previously known polyaniline conductive polymer compositions. Furthermore, the adjustability of the pH range and the conductivity of the conductive polymer concerned remaining at a sufficiently high level in spite of the steps it is subjected to according to the invention further widen the applications of the polyaniline-based conductive polymer composition according to the invention. Such a polymer material, which has a substantially higher pH value and contains a polyaniline doped with a protonic acid, further comprises a metal compound and neutralizing compound.

The above-mentioned objects and advantages, and other objects and advantages of the present invention are achieved by providing a processable, electrically conductive polymer material comprising a polyaniline or derivative thereof doped with a protonic acid, a metal compound and a neutralizing compound.

At least a portion of the metal compound is in the form of a reaction product of a starting metal compound with an acid capable of forming a compound with the metal. More particularly, this acid may be the same acid as the protonic acid used to dope the polyaniline or derivative thereof, such as an organic sulfonic acid, e.g., dodecylbenzene sulfonic acid. The metal portion of the metal compound can be selected from Mg, Ca, Ti, Zn, Sr, Zr, Ba, or Pb, more particularly selected from Mg, Ca, Zn, or Ba, most particularly Zn. For instance, ZnO can be added to the mixture of the conductive polymer to form a final metal compound that is, at least in part, the reaction product of ZnO and the acid component.

The neutralizing compound may be a basic metal compound, preferably a metal carbonate, for example, $CaCO_3$, $Na_2CO_3$, $NaHCO_3$, $MgCO_3$, $SrCO_3$, $MnCO_3$, $KHCO_3$, borax, and mixtures thereof, more particularly calcium carbonate or an equivalent thereof. The neutralizing compound may be a different compound from the metal precursor compound, or from the reaction product of the metal precursor compound and the protonic acid. This neutralizing compound may be present in an amount of 0.1 to 10% by weight, calculated as calcium carbonate based on the total composition.

The electrically conductive material typically has a conductivity of at least $10^{-9}$ S/cm, more particularly at least $10^{-6}$ S/cm, most particularly at least $10^{-3}$ S/cm.

The objects and advantages of the invention are also achieved by an electrically conductive plastics mixture containing the processable, electrically conductive polymer material described above in combination with an insulating polymer matrix, which may be a thermoset, a thermoplast, or an elastomeric polymer. More particularly, the insulating polymer matrix may be selected from the group consisting of a thermoplastic homo- or copolymer based on olefins, styrene, vinyl polymers or acrylic polymers, or a mixture thereof, and a thermoplastic condensation polymer.

When the neutralizing compound is present in an amount of 0.3% by weight or less, based on the electrically conductive polymer material, then the impact strength of the conductive plastics mixture of the invention may be up to 30% higher than the impact strength of the corresponding plastics mixture without any neutralizing compound.

The objects and advantages of the present invention are also obtained by providing a method for the preparation of an electrically conductive polymer material containing a polyaniline or derivative thereof doped with a protonic acid discussed above, comprising (a) contacting a polyaniline or a derivative thereof, a polymer-doping protonic acid, a metal compound, an acid capable of reacting with said metal compound to form a second metal compound, and a neutralizing compound, and (b) heat treating this mixture at a temperature of 50° C. to 400° C.

The objects and advantages of the present invention are also achieved by providing a method for preparing the electrically conductive plastics mixture mentioned above, comprising combining the electrically conductive polymer material discussed above with an insulating polymer matrix in a melt mixing device at a temperature of 80° C. to 350° C.

As pointed out above, it is an object of the present invention to provide a method for the preparation of a processable conductive polymer based on polyaniline or a derivative thereof, the polymer having a substantially improved processability, especially in the molten state.

In another embodiment of the invention, the disadvantages of the previously disclosed methods mentioned above have now been eliminated and the defined objects and advantages of the present invention have been further achieved by a method for the preparation of a conductive polymer material based on a polyaniline or a derivative thereof and a protonic doping acid, the method comprising (a) producing a mixture which comprises 1–20 wt. % polyaniline or its derivative, 50–90 wt. % protonic doping acid, calculated as dodecylbenzene sulfonic acid, and 1–45 wt. % of a plasticizing component selected from the group consisting of water, a $C_1$–$C_3$ alcohol, and mixtures thereof to form a mixture;

(b) feeding the mixture obtained from step (a) into a melt-mixing apparatus, and subjecting said mixture to shear forces at a temperature of 50°–400° C. to obtain a blend;

(c) recovering the blend obtained from step (b) from the melt-mixing apparatus; and (d) optionally posttreating the blend recovered in step (c). This posttreatment may comprise combining the blend with another polymer, such as a thermoplast, in a mixing apparatus. This process may also comprise adding a metal precursor compound and/or a neutralizing compound, both as discussed above, in either step (a) or step (c), in order to achieve the further advantages disclosed above.

DETAILED DESCRIPTION OF THE INVENTION

According to the present invention it has now, surprisingly, been observed that, when a conductive polymer complex made up of a polyaniline doped with a protonic acid and a reaction product formed by a metal compound and an acid additionally contains an additional neutralizing compound, a conductive polymer material is obtained the pH range of which is adjustable and the pH range of which is adjusted to a substantially higher pH range (pH approximately 3–8, preferably 5–7), the adjusted pH value of which remains consistently the same throughout the entire product, and the level of conductivity of which remains high in spite of the additives. The present invention relates in particular to the neutralizing, with a additional neutralizing compound, of a conductive polymer complex made up of a polyaniline, preferably of the emeraldine form, doped with sulfonic acid, and of a compound formed by a zinc compound and a protonic acid.

In practice the polyaniline or its derivative used may be any form of polyaniline, such as the leucoemeraldine, protoemeraldine, emeraldine, nigraline or toluprotoemeraldine form. The polyaniline may also be in the form of a derivative thereof, for example a substituted polyaniline. The substituted derivatives of the polyaniline forms mentioned above are, of course, also within the protective scope of the invention. The most preferred polyaniline-type conductive polymer is polyaniline, and preferably its emeraldine base form, the formula of which is shown above in connection with the description of the state of the art.

The protonic doping acid used in the invention may be any protonic acid which dopes polyaniline or a derivative thereof. Typical protonic acids include HCl, $H_2SO_4$, $HNO_3$, $HClO_4$, $HBF_6$, HF, phosphoric acids, sulfonic acids, picrinic acid, m-nitrobenzoic acid, dichloroacetic acid, and polymeric acids. A preferred protonic doping acid is an organic sulfonic acid, especially an aromatic sulfonic acid, and most preferably dodecylbenzene sulfonic acid (DBSA). Other usable protonic doping acids have been disclosed in, for example, U.S. Pat. No. 5,171,478, which publication is hereby incorporated by reference.

In its most preferred embodiment the present invention relates to the neutralization, with calcium carbonate ($CaCO_3$), of a emeraldine-form polyaniline doped with dodecylbenzenesulfonic acid and a compound formed by the reaction of zinc oxide (ZnO) and dodecylbenzenesulfonic acid.

Dodecylbenzenesulfonic acid acts in the complex both as a doping agent and as a plasticizer of the complex. An additional plasticizing agent may also be used, as discussed in more detail below. This plasticizing agent may consist of other agents for the plasticizing of polymers. Examples of such plasticizing agents include water, alcohols such as methanol, ethanol, propanols, benzyl alcohols, etc., ethers such as diethylether, ketones such as acetone, acetophenone, etc., phenols, amines, esters, fluorinated carboxylic and sulfonic acids, amides, phosphoramides, etc. In the final product obtained after the treatments carried out on the mixture made up of the above-mentioned complex and a additional neutralizing compound, i.e. mixing, solidification, etc., the proportion of the plasticizing agents in the resulting product may often be so small as to be difficult to detect.

The metal precursor compound, which is capable of reacting with a protonic acid, desirably the protonic doping acid, renders the doped polyaniline a less acid, more easily melt-processable, better mixing, and more stable conductive polymer material. The metal compound may vary greatly depending on whether it is desired to emphasize neutralization, in which case compounds of metals such as magnesium, barium or calcium are possible, or whether it is desired to emphasize the stabilizing action, in which case compounds of metals such as zinc, copper, aluminum, titanium, iron or zirconium are preferable. Also compounds of cadmium, lead and stannium are possible. Mixtures of metal compounds and most metal compounds are suitable for this purpose according to the invention.

The metal precursor compounds may be oxides, hydroxides, halides, or equivalents thereof. Also, salts of weak acids, such as stearates, carbonates, ricinoleates, palmetates, octoates, laurates, phenolates, maleates, and octylthioglycolates can be used. The metal compound may also be a condensation product of a metal compound and a protonic acid, having a melting point below about 300° C.

Particularly suitable metal compounds used in the invention are based on zinc, copper, calcium or magnesium, the most preferred metal compound is based on zinc, such as zinc stearate or zinc oxide. Preferred compounds are oxides and hydroxides, and the most preferred are oxides, of which zinc oxide ZnO is the most preferred. According to one particular embodiment, zinc oxide may be first reacted with a protonic doping acid, such as dodecylbenzene sulfonic acid, and the zinc didodecylbenzoate thus obtained is added to the components forming the conductive polymer.

The use of a neutralizing compound, preferably calcium carbonate, together with a zinc compound, for the neutralization of doped polyaniline is thus advantageous not only for achieving consistent and sufficient neutralization and pH adjustability, but also for retaining the level of conductivity. It can be shown that the mere increasing of the amount of the zinc compound, such as zinc oxide, in order to improve the result of neutralization will result in a dramatic lowering of the level of conductivity. On the other hand, when additional neutralizing compound is used this does not happen; the level of conductivity unexpectedly remains high for a long time, and if additional neutralizing compound is added further, the conductivity level drops only gradually, and not suddenly and dramatically as it does when mere zinc oxide is used.

According to the present invention, a neutralizing compound, for example calcium carbonate ($CaCO_3$), is thus preferably used for adjusting the pH of the doped polyaniline. The obtained final product, a conductive polymer complex with a higher pH value, thus has the following ingredients: a polyaniline which is preferably of the emeraldine form; a protonic acid, most preferably sulfonic acid or a derivative thereof, used for the doping of the polyaniline and as a building block of a plasticizer; a metal compound, preferably zinc oxide, used for neutralization; and an additional neutralizing compound, preferably a carbonate or hydrogen carbonate, most preferably calcium carbonate, used for improving the result of neutralization.

It is possible, when so desired, to mix a conductive polymer complex made up of these ingredients with an insulating polymer matrix material in order to produce an electrically conductive plastics mixture. Such a matrix material may be a thermosetting plastic, a thermoplast, or an elastomeric polymer. The matrix material should be compatible with the conductive polymer and be melt processable within the same temperature ranges as the conductive polymer itself. The matrix polymer is preferably a thermoplastic homo- or copolymer based on olefins, styrene, vinyl polymers or acrylic polymers, or a mixture thereof, or a thermoplastic condensation polymer. Examples of matrix polymers most commonly used include polyethylene, polypropylene, styrenebutadiene, polyester, polyamide, acryl-butyl-styrene, and polycarbonate. From both a technological and an economical viewpoint, it is preferable to aim at making the proportion of the conductive polymer complex in the plastics mixture as small as possible. A Conductive polymer complex is expensive, and on the other hand the mechanical properties of the entire plastics mixture will be better if the proportion of the conductive polymer complex in the mixture is as small as possible. The proportion of conductive polymer complex in the plastics mixture may be within a range of approximately 1–60 wt. %, preferably approximately 1–40 wt. %, and most preferably 5–15 wt. %. As regards the plastics mixtures of the conductive polymer material and matrix materials, reference is also made to EP application 582919, mentioned above.

According to the method of the present invention, the proportion of the neutralizing agent, calculated as calcium carbonate, which is added in order to improve the result of the neutralizing of the conductive polymer in the final-product conductive polymer complex may vary from approximately 0.1 percent by weight to approximately 20 percent by weight. Preferably calcium carbonate is added at approximately 0.5–8 wt. % and most preferably at 0.5–2 wt. % of the total amount of the mixture.

When used in accordance with the invention, the neutralizing compound has an advantageous effect not only on the pH values of the conductive polymer material and the retaining of its conductivity level, but also on its impact strength. In practical applications this can best be observed when the conductive polymer is mixed with insulating plastics materials such as those mentioned above. When a additional neutralizing compound, preferably calcium carbonate, is used, the melt-processed conductive plastic pieces obtained will be stronger and more durable. In other words, plastics mixture pieces which are made of conductive and insulating polymer and which contain calcium carbonate in amounts of only 0.3 wt. % or less have a considerably higher impact strength than pieces which do not contain calcium carbonate. For example, with a calcium carbonate amount of 0.3 wt. %, an improvement of up to 30% is obtained in the Izod impact strength ($kJ/m^2$) in a plastics mixture which contains conductive polymer material in an amount of approximately 15 wt. % and matrix polymer in an amount of approximately 85 wt. %.

The other preferred ingredients in the conductive polymer complex obtained as the final product were (before being mixed with the matrix polymer): an emeraldine-form doped polyaniline; dodecylbenzenesulfonic acid (DBSA); and zinc oxide. The amount of polyaniline is approximately 1–30 wt. %, preferably approximately 4–20 wt. %, the amount of DBSA is approximately 50–95 wt. %, preferably approximately 70–90 wt. %, and the amount of zinc oxide approximately 1–10 wt. %, preferably approximately 1.5–8 wt. %. The amount of calcium carbonate was 0.1–20 wt. %, preferably approximately 0.5–8 wt % most preferably 0.5–2 wt. %. If a final product having a composition such as this is mixed with a matrix polymer, its proportion in their mixture is approximately 1–60 wt. % preferably 1–40 wt %, and most preferably 5–15 wt. %.

A preferred composition for a plastics mixture suitable for ESD applications made by injection molding may be, for example, one which contains conductive polymer complex in an amount of approximately 15 wt. % and matrix polymer in an amount of approximately 85 wt. %. Such a plastics mixture thus preferably contains polyaniline in an amount of approximately 1 wt. %, DBSA in an amount of approximately 12.5 wt. %, ZnO in an amount of approximately 1.3 wt. % and $CaO_3$ in an amount of approximately 0.2 wt. %, as well as matrix polymer in an amount of approximately 85 wt. %.

Another preferred composition for a plastics mixture suitable for EMI applications may be, for example, one which contains conductive polymer complex approximately 20–40 wt. % and matrix polymer in an amount of approximately 60–80 wt. %. Such a plastics mixture thus preferably contains polyaniline in an amount of approximately 2–5 wt. %, DBSA in an amount of approximately 20–30 wt. %, ZnO in an amount of approximately 0.5–1.5 wt. % and $CaCO_3$ in an amount of approximately 0.4–3 wt. %, as well as matrix polymer in an amount of approximately 60–80 wt. %.

The ingredients of the conductive polymer material may be mixed with each other by using various mixers, kneaders, etc. In a preferred embodiment the mixing is carried out using a screw mixer. The ingredients may be mixed with each other in a number of different orders. Examples of these orders are given below.

In one order of mixing, it is possible to introduce the ingredients, i.e. the polymer, the protonic acid used as the,doping agent, the metal compound, the acid which forms a compound with the metal compound, and the additional neutralizing compound which improves the result of neutralization, all at the same time and then to mix them preferably by using a screw mixer.

In another order of mixing, it is possible to mix together the metal compound and the acid which forms a compound with it, and to add to this blend the additional neutralizing compound, and to add the mixture thus obtained to a mixture of the polymer and the doping acid.

In another order of mixing, the polymer and the doping acid are first mixed together, and the additional neutralizing compound is added to this mixture. The compound formed by the metal compound and the acid is then added to the mixture obtained.

Furthermore, it is also possible to carry out the mixing by adding to a blend of the polymer and the doping acid one portion of the compound formed by the metal compound and the acid and by adding the additional neutralizing compound to another portion of the compound formed by the metal compound and the acid, and adding the latter mixture thus obtained to the mixture containing the polymer.

It is also possible first to mix the metal compound and the additional neutralizing compound and to mix this blend with the acid which forms a compound with the metal compound, and to add the mixture thus obtained to a mixture of the polymer and the doping acid.

One further alternative order of adding the ingredients is that a portion of the additional neutralizing compound is added to a portion of the compound formed by the metal compound and the acid, and this mixture is added to a mixture of the polymer and the doping agent. The remainder of the mixture formed by the metal compound and acid and the additional neutralizing compound is added to the mixture thus obtained.

In preferred embodiments, the same acid, which is preferably, for example, dodecylbenzenesulfonic acid, is used both as the acid which forms a compound with metal compound and as the doping acid. In this case it is possible further to carry out the mixing by mixing all of the DBSA and the metal compound and to add to this mixture the additional neutralizing compound which improves the result of neutralization. The polymer is then added to the mixture thus obtained, which contains DBSA in excess. In practice the mixings can be carried out in such a manner that some of the preliminary mixtures are made by using, for example, kneaders, and these preliminary mixtures are combined and the actual mixing, together with the heat treatment, is carried out, for example, in the screw mixer mentioned above.

The extrusion of the conductive polymer complex is preferably carried out, for example, by running the mixture through the screw mixer once or several times, the temperatures being approximately 50°–400° C., preferably 80°–300° C., and most preferably 100°–200° C. The same procedure is used in the extrusion as has been disclosed in EP patent applications 545729 and 582919.

The following examples illustrate the embodiment of the present invention wherein a neutralizing compound is used in greater detail. However, they are intended only to illustrate the invention, and they shall not be interpreted as limiting the invention.

REFERENCE EXAMPLE (without calcium carbonate)

A conductive polymer complex which contained 16 wt % emeraldine polyaniline, 64 wt % DBSA and 20 wt % ZnO was prepared by extruding the mixture of these components three times at 170° C. with screw speed 50 rpm. This conductive polymer complex was mixed in an amount of 25 wt % with high density polyethylene (NCPE 3415 produced by Neste Oy).

The experiment was repeated by mixing the same ingredients at the same ratios by using the same technique. The conductivities of the resulting two parallel blends deviated two decades, indicating the difficulties encountered if conductive polymer complex is made without additional neutralizing agent.

Example 1

A conductive polymer complex which contained emeraldine polyaniline 7.6 wt %, DBSA 82.5 wt %, ZnO 9.1 wt % and $CaCO_3$ 0.8 wt % was prepared by extruding the mixture of these components three times at temperatures 165° C., 180° C. and 180° C. with screw speed 50 rpm. The pH obtained for the complex was 3.1 and its conductivity, as measured by the 4-probe method, was $3.5 *10^{-2}$ S/cm.

Example 2

A conductive polymer complex which contained emeraldine polyaniline 7.5 wt %, DBSA 81.9 wt %, ZnO 9.0 wt % and $CaCO_3$ 1.6 wt % was prepared by the procedure used in Example 1. The pH obtained for the complex was 5.2 and its conductivity as measured by the 4-probe method was $2.0 *10^{-2}$ S/cm.

Example 3

The conductive polymer complex according to Example 1 was mixed in an amount of 10 wt. % with HDPE (NCPE 3415, manufactured by Neste Oy), used as matrix polymer. The conductivity of rods injection molded from the polymer mixture thus obtained was $4.2 *10_{-5}$ S/cm as measured by the 4-probe method.

Example 4

The conductive polymer complex according to Example 2 was mixed in an amount of 10 wt. % with the HDPE used in Example 3. The conductivity of rods injection molded from the polymer mixture thus obtained was $3.1 *10^{-5}$ S/cm as measured by the 4-probe method.

Example 5

The conductive polymer complex according to Example 2 was mixed in an amount of 10 wt. % with a polystyrene used as matrix polymer (SB 735). The conductivity of rods injection molded from the polymer mixture thus obtained was $2.8 *10^{-6}$ S/cm as measured by the 4-probe method.

Example 6

A polymer mixture was prepared which contained polystyrene (SB 735) 75 wt. %; conductive polymer complex according to Example 2, but without $CaCO_3$, 4.7 wt. %; styrene-ethylene-butadiene block polymer (SEBS, manufactured by Shell) 10 wt. %; and $CaCO_3$ 0.3 wt. %. The Izod notch impact strength of rods injection molded from the mixture was 6.4 $kJ/m^2$ at 23° C.

Example 7

A polymer mixture according to Example 5 was prepared, with no calcium carbonate addition. The Izod notch impact strength at 23° C. was only 4.9 $kJ/m^2$.

Example 8

Three polymer mixtures were prepared which contained HDPE polyethylene (NCPE 3415) 85 wt % and a conductive polymer complex prepared according to Example 1 which contained $CaCO_3$ in amounts of a) 0 wt. %; b) 0.8 wt. %; and c) 1.6 wt. %. The impact strengths measured for the mixtures were a) 85.6 J/m; b) 91.3 J/m; and c) 96.6 J/m.

Example 9

A conductive polymer complex which contained emeraldine polyaniline 7.5 wt % DBSA 82.0 wt %, ZnO 9.0 wt % and $Na_2CO_3$ 1.5 wt % was prepared according to Example 1. The pH obtained for the complex was 6.0 and its conductivity as measured by the 4-probe method was $2.7 *10^{-4}$ S/cm.

Example 10

A conductive polymer complex which contained emeraldine polyaniline 7.5 wt %, DBSA 81.0 wt %, ZnO 8.9 wt % and $NaHCO_3$ 2.6 wt % was prepared according to the Example 1. The pH obtained for the complex was 5.9 and its conductivity as measured by the 4-probe method was $4.0 *10^{-5}$ S/cm.

Example 11

A conductive polymer complex which contained emeraldine polyaniline 7.5 wt %, DBSA 82.2 wt %, ZnO 9.0 wt % and $MgCO_3$ 1.3 wt % was prepared according to Example 1. The pH obtained for the complex was 5.6 and its conductivity as measured by the 4-probe method was $1.0 *10^{-2}$ S/cm.

Example 12

A conductive polymer complex which contained emeraldine polyaniline 7.5 wt %, DBSA 81.3 wt %, ZnO 8.9 wt % and $SrCO_3$ 2.3 wt % was prepared according to Example 1. The pH obtained for the complex was 6.2 and its conductivity as measured by the 4-probe method was $2.1 *10^{-3}$ S/cm.

Example 13

A conductive polymer complex which contained emeraldine polyaniline 7.5 wt %, DBSA 81.7 wt %, ZnO 9.0 wt % and $MnCO_3$ 1.8 wt % was prepared according to Example 1. The pH obtained for the complex was 6.1 and its conductivity as measured by the 4-probe method was $6.4 *10^{-4}$ S/cm.

Example 14

A conductive polymer complex which contained emeraldine polyaniline 7.5 wt %, DBSA 80.6 wt %, ZnO 8.8 wt % and $KHCO_3$ 3.1 wt % was prepared according to Example 1. The pH obtained for the complex was 6.0 and its conductivity as measured by the 4-probe method was $1.2 *10^{-3}$ S/cm.

Example 15

A conductive polymer complex which contained emeraldine polyaniline 7.5 wt %, DBSA 78.1 wt %, ZnO 8.5 wt % and Borax ($Na_2B_{O7}*10 H_2O$) 5.9 wt % was prepared according to Example 1. The pH obtained for the complex was 6.1 and its conductivity as measured by the 4-probe method was $1.1 *10^{-4}$ S/cm.

Example 16

The conductive polymer complex prepared according to Example 9 was mixed in an amount of 10 wt % with HDPE (NCPE 3415). The conductivity of the rods injection molded from the polymer mixture thus obtained was 2.1 *10$^{-6}$ S/cm as measured by the 4-probe method.

Example 17

The conductive polymer complex prepared according to Example 10 was mixed in an amount of 10 wt % with HDPE (NCPE 3415). The conductivity of the rods injection molded from the polymer mixture thus obtained was 4.0 *10$^{-6}$ S/cm as measured by the 4-probe method.

Example 18

The conductive polymer complex prepared according to Example 11 was mixed in an amount of 10 wt % with HPDE (NCPE 3415). The conductivity of the rods injection molded from the polymer mixture thus obtained was 2.5 *10$^{-6}$ S/cm as measured by the 4-probe method.

Example 19

The conductive polymer complex prepared according to Example 12 was mixed in an amount of 10 wt % with HDPE (NCPE 3415). The conductivity of the rods injection molded from the polymer mixture thus obtained was 1.6 *10$^{-5}$ S/cm as measured by the 4-probe method.

Example 20

The conductive polymer complex prepared according to Example 13 was mixed in an amount of 10 wt % with HDPE (NCPE 3415). The conductivity of the rods injection molded from the polymer mixture thus obtained was 1.3 *10$^{-5}$ S/cm as measured by the 4-probe method.

Example 21

The conductive polymer complex prepared according to Example 14 was mixed in an amount of 10 wt % with HDPE (NCPE 3415). The conductivity of the rods injection molded from the polymer mixture thus obtained was 4.1 *10$^{-6}$ S/cm as measured by the 4-probe method.

Example 22

The conductive polymer complex prepared according to Example 15 was mixed in an amount of 10 wt % with HDPE (NCPE 3415). The conductivity of the rods injection molded from the polymer mixture thus obtained was 1.7 *10$^{-6}$ S/cm as measured by the 4-probe method.

Example 23

A conductive polymer complex which contained emeraldine polyaniline 7.5 wt %, DBSA 81.2 wt %, ZnO 8.9 wt % and NH$_4$HCO$_3$2.4 wt % was prepared according to Example 1. This conductive polymer complex was mixed in an amount of 10 wt % with HDPE (NCPE 3415). The conductivity of the rods injection molded from the polymer mixture thus obtained was lower-than 1 *10$^{-9}$ S/cm.

Example 24

A conductive polymer complex which contained emeraldine polyaniline 7.5 wt %, DBSA 81.5 wt %, ZnO 8.9 wt % and K$_2$CO$_3$2.1 wt % was prepared according Example 1. This conductive polymer complex was mixed in an amount of 10 wt % with HDPE (NCPE 3415). The conductivity of the rods injection molded from the polymer mixture thus obtained was lower than 1 *10$^{-9}$ S/cm.

Example 25

A conductive polymer complex which contained emeraldine polyaniline 7.5 wt %, DBSA 82.3 wt %, ZnO 9.0 wt % and Ca(OH)$_2$1.2 wt % was prepared according to Example 1. This conductive polymer complex was mixed in an amount of 10 wt % with HDPE (NCPE 3415). The conductivity of the rods injection molded from the polymer mixture thus obtained was lower than 1 *10$^{-9}$ S/cm.

In the embodiment of the present invention wherein a plasticizing agent selected from the group consisting of water, a $C_1$–$C_3$ alcohol, and mixtures thereof is used, it is advantageous if the proportion of polyaniline or its derivative is approx. 4–10 wt. % of the amount of the mixture produced in step (a).

It is especially advantageous if the mixture obtained in step (a) of the present method comprises 60–85 wt. % protonic doping acid, calculated as dodecylbenzene sulfonic acid.

As pointed out above, in the method according to the invention, in which a mixture comprising a polyaniline or a derivative thereof, a protonic doping acid, and water, a $C_1$–$C_3$ alcohol, or a mixture thereof, is compounded at an elevated temperature, the water and the $C_1$–$C_3$ alcohol serve as a plasticizing agent. It can be stated that the idea of the invention is based specifically on the combination of such a plasticizing agent and compounding, whereby a conductive polymer material more usable than previously is obtained. The addition of a plasticizing agent, among other things, lowers the required mixing temperature, and thus the thermal decomposition of the mixture being treated decreases. In addition, the corroding action of the mixture on the apparatus is reduced. Exemplary plasticizing agents include water, methanol, ethanol, or a mixture of these. The most preferable component is water.

In step (a) this embodiment of the present invention, it is advantageous if the produced mixture comprises approximately 1–35 wt. %, preferably approximately 5–20 wt. %, of water or a $C_1$–$C_3$ alcohol. When the mixture of step (a), which has the abovementioned amount of water and/or $C_1$–$C_3$ alcohol, is mixed by means of the shear forces of a melt-mixing apparatus at a temperature of 50°–400° C., the final conductive polymer material will not contain a significant amount of the plasticizing component used in step (a).

According to one preferred embodiment of the invention, in connection with the mixing together of a polyaniline or its derivative, a protonic doping acid and a water or $C_1$–$C_3$ alcohol component in step (a), it is possible to add to them also a metal compound which is preferably capable of reacting or has reacted with a protonic acid, such as the doping acid. Such a metal compound renders the doped polyaniline a less acid, more easily melt-processable, better mixing, and more stable conductive polymer material. The metal compound may vary greatly depending on whether it is desired to emphasize neutralization, in which case compounds of metals such as magnesium, barium or calcium are possible, or whether it is desired to emphasize the stabilizing action, in which case compounds of metals such as zinc, copper, aluminum, titanium, iron or zirconium are preferable. Also compounds of cadmium, lead and stannium are possible. Mixtures of metal compounds and most metal compounds are suitable for the purpose according to the invention.

The metal compounds may be oxides, hydroxides, halides, or equivalent. Also salts of weak acids, such as stearates, carbonates, ricinoleates, palmetates, octoates, laurates, phenolates, maleates, and octylthioglycolates can be used. An important compound is a condensation product of a metal compound and a protonic acid, having a melting point below 300° C.

The preferred metal compounds used in the invention are based on zinc, copper, calcium or magnesium, the most preferred metal compound is based on zinc, such as zinc stearate or zinc oxide. Preferred compounds are oxides and hydroxides, and the most preferred are oxides, of which zinc oxide ZnO is the most preferred. According to the most preferred embodiment, zinc oxide is first reacted with a protonic doping acid, such as dodecylbenzene sulfonic acid, and the zinc didodecylbenzene sulfonate thus obtained is added to the components mentioned at the beginning of step (a).

It is advantageous if the amount of the above-mentioned metal compound is approximately 3–10 wt. %, preferably approximately 5–9 wt. %, of the combined total weight of the compound and the components of step (a).

It is also advantageous to combine the components of step (a) or the blend recovered in step (c) with a neutralizing compound, such as calcium carbonate or the other neutralizing compounds discussed above The use of calcium carbonate will neutralize the polyaniline or derivative thereof doped with a protonic doping agent, and will cause both sufficient neutralization and retaining of conductivity in the forming conductive polymer material. It is especially advantageous to use calcium carbonate together with the above-mentioned metal compound, such as zinc oxide or its doping acid salt. A compound of metal such as zinc also acts well as a plasticizer, but in high concentrations it will lead to a dramatic lowering of the conductivity of the material. Instead, when calcium carbonate is used this will not occur: the conductivity will remain at a high level for a long time. As was already stated, both the metal compound and the calcium carbonate may be added either before the compounding (in connection with step (a)) or thereafter (after step (c)).

The amount of calcium carbonate used is preferably approximately 0.1–20 wt %, preferably approximately 0.1 to 8 wt. % and most preferably approximately 0.5–2%, of the combined total weight of the calcium carbonate and the components of step (a). The calcium carbonate acts best when the method according to the invention is used for preparing a conductive plastics mixture containing a large amount of a thermoplast in addition to the conductive plastic, as discussed more fully below.

In the method according to this embodiment of the present invention, the conductive polymer material is prepared by first producing in step (a) a mixture which is then in step (b) fed into a compounder, where it is mixed by shear forces, and is recovered in step (c) and is possibly treated further in step (d). According to one preferred embodiment, step (a) is carried out (i) by first producing a polyaniline or derivative thereof which contains water or $C_1$–$C_3$ alcohol 1–70 wt. %, preferably by polymerizing a monomer of the polyaniline or its derivative in the presence of said water or alcohol; (ii) mixing a protonic doping acid with the polyaniline or derivative thereof, obtained from step (i); and (iii) when necessary, adding water, $C_1$–$C_3$ alcohol or mixture thereof, and preferably a metal compound, such as ZnO, and a neutralization agent, such as $CaCO_3$, to the mixture obtained from step (ii).

According to another, but not quite as preferred embodiment, a substantially dry polyaniline or derivative thereof may be mixed with a protonic doping acid and possibly other components, and water or $C_1$–$C_3$ alcohol or mixture thereof are added thereto. These are mixed to serve as the initial material for compounding.

As was mentioned above, the components of step (a) of the method according to the invention, or the blend recovered in step (c) can, according to one embodiment, be combined with a thermoplast. A conductive polymer mixture is produced which has the properties of a commercial thermoplast but which, owing to its conductive polymer, is electrically conductive, so that it is suitable for being used, for example, for electrostatic discharge elimination (ESD), and electromagnetic interference shielding (EMI).

The thermoplast used in the method according to the invention may be any homo- or copolymer or any mixture thereof with each other or with other additives. According to one embodiment the thermoplast is or contains a homo- or copolymer which is based on an olefin, a homo- or copolymer which is based on styrene or a derivative thereof, a vinyl homopolymer or vinyl copolymer, a thermoplastic condensation polymer, or a mixture of these.

In general, the proportion of thermoplast in a commercial material is high, and according to one embodiment of the present invention, this proportion is approximately 50–99 wt. %, preferably approximately 70–95 wt. % of the combined total amount of the mixture from step (a) and a thermoplast.

The mixing in step (b) is carried out by compounding by any standard-type mixing apparatus intended for a viscoelastic material. It may be an extruder in which the cylinder temperature and the temperature profile are adjustable, and quite particularly a double-screw extruder, in which the screw pitch and the direction of the helix and of rotation may vary. Also internal mixers, such as Banbury mixers, which are in wide commercial use, can be used. For example, heatable double-roll mills are suitable for small-scale production. From the viewpoint of the invention it is essential that the mixture of step (a) is mixed using relatively high shear forces in order to accomplish the desired solidification of the product.

It is advantageous if the mixing in step (b) is performed at a temperature of 80°–300° C., preferably 100°–200° C.

As stated above, various additives may also be added to the blend recovered from the melt mixing apparatus. One such additive is the above-mentioned metal compound, which both neutralizes and plasticizes the blend without the electric conductivity of the blend being substantially lowered. The blend obtained from step (c) may also be combined with a thermoplast of the types mentioned above. When the blend recovered in step (c) is combined with the metal compound, the calcium carbonate and/or the thermoplast, according to one embodiment of the invention, the combined composition is fed into a melt-mixing apparatus, in which it is mixed at a temperature of approximately 80°–350° C., preferably approximately 130°–230° C. In this embodiment, two mixings by means of shear forces and heat are carried out, one of them on the mixture of step (a) and the other on the blend recovered in step (c).

Examples are of this embodiment of the present invention are presented below. However, these examples only illustrate, and do not limit, the present invention..

Example 26

By the screw solidification method a conductive polymer complex was prepared which contained 9.7 wt. % EB wet from a water wash (dry matter content approximately 50%), 71.4 wt. % DBSA, 7.7 wt. % ZnO, 1.5 wt. % $CaCO_3$, and 9.7 wt. % water. A mixture was prepared from the conductive polymer complex prepared in the manner described above and Neste HD polyethylene (NCPE 3415) at a mass ratio 10/90, the conductivity of pieces extruded from this mixture being $3.5 \cdot 10^{-5}$ S/cm measured by the 4-probe method.

Example 27

By the screw solidification method a conductive polymer complex was prepared which contained 9.7 wt. % EB wet from an ethanol wash (dry matter content approximately 50%), 71.4 wt. % DBSA, 7.7 wt. % ZnO, 1.5 wt % CaCO$_3$ and, 9.7 wt. % water. A mixture was prepared from the conductive polymer complex prepared in the manner described above and Neste HD polyethylene (NCPE 3415) at a mass ratio 10/90, the four-probe conductivity of pieces extruded from this mixture being $1.2 \cdot 10^{31\ 4}$ S/cm.

Example 28

A mixture was prepared from a conductive polymer complex prepared in the manner described in Example 27 and Neste HD polyethylene (NCPE 3415) at a mass ratio 8/92, the four-probe conductivity of pieces extruded from this mixture being $2.2 \cdot 10^{-5}$ S/cm.

Example 29

By the screw solidification method a conductive polymer complex was prepared which contained 6.2 wt. % EB dried after an ethanol wash (dry matter content higher than 99%), 83.4 wt. % DBSA, 8.9 wt. % ZnO, and 1.5 wt. % CaCO$_3$. A mixture was prepared from the conductive polymer complex prepared in the manner described above and Neste HD polyethylene (NCPE 3415) at a mass ratio 8/92, the four-probe conductivity of pieces extruded from this mixture being lower than $1 \cdot 10^{-9}$ S/cm.

Example 30

A complex which contained 7.5% EB dried after an ethanol wash (dry matter content higher than 99%), 82.2 wt. % DBSA, 8.8 wt. % ZnO, and 1.5 wt. % CaCO$_3$ was solidified by heating it in a dielectric analyzer at a rate of 3° C./min. The solidification temperature (determined as the maximum point of the tangent of loss) was 160° C.

Example 31

A complex which contained 6.5 wt. % EB dried after an ethanol wash (dry matter content higher than 99%), 72.6 wt. % DBSA, 7.9 wt. % ZnO, 1.5 wt. % CaCO$_3$, and 12 wt. % water was solidified by heating it in a dielectric analyzer at a rate of 3° C./min. The solidification temperature was 110° C.

Example 32

The procedure used was that of the preceding examples, but the mixing proportions were those set forth in Table 1. The results are also shown in Table 1.

TABLE 1

| | Proportionate amounts of additives | | | | | | | | |
|---|---|---|---|---|---|---|---|---|---|
| | Exp. 1 | Exp. 2 | Exp. 3 | Exp. 4 | Exp. 5 | Exp. 6 | Exp. 7 | Exp. 8 | Exp. 9 |
| PANI EB | 6.0% | 6.0% | 6.8% | 7.2% | 6.0% | 6.0% | 6.0% | 6.0% | 6.0% |
| DBSA | 66.3% | 66.3% | 63.6% | 62.6% | 66.3% | 66.3% | 66.3% | 66.3% | 66.3% |
| ZnO | 7.1% | 7.1% | 6.6% | 6.4% | 7.1% | 7.1% | 7.1% | 7.1% | 7.1% |
| Water | 19.4% | 19.4% | 21.9% | 23.1% | 19.4% | 19.4% | 19.4% | 19.4% | 19.4% |
| CaCO3 | 1.2% | 1.2% | 0.9% | 0.7% | 1.2% | 1.2% | 1.2% | 1.2% | 1.2% |
| Matrix plastic and its proportionate amount | | | | | | | | | |
| Matrix | PVC | PVC | PVC | PVC | PP/SB | PVC | HDPE | PP | PS |
| Amount % | 90 | 85 | 90 | 90 | 80 | 85 | 80 | 80 | 85 |
| Conductivity | 1.00e-04 | 5.00e-03 | 1.00e-04 | 6.00e-07 | 3.00e-04 | 5.00e-03 | 1.00e-03 | 1.00e-05 | 5.00e-04 |

Example 33

The procedure used was that described in the preceding examples, but the proportions of ingredients and the results were in accordance with Table 2.

TABLE 2

| Proportionate amounts of additives | | | | |
|---|---|---|---|---|
| Exp. 1 | Example 8 | Example 9 | Example 10 | |
| 6.0% | 5.1% | 4.4% | 4.4% | PANI EB |
| 66.3% | 55.5% | 47.8% | 47.8% | DBSA |
| 7.1% | 5.9% | 5.1% | 5.1% | ZnO |
| 19.4% | 32.4% | 41.9% | 41.9% | water |
| 1.2% | 1.0% | 0.9% | 0.9% | CaCO3 |
| | | | | Matrix plastic and its proportionate amount |
| PVC | PVC | PVC | PVC | Matrix |
| 90 | 90 | 90 | 90 | Amount % |
| 1.00e-04 | as in Example 1 | as in Example 1 | as in Example 1 | Conductivity |

The invention being thus described, it will be obvious that the same may be varied in many ways. Such variations are not to be regarded as a departure from the spirit and scope of the invention, and all such modifications as would be obvious to one skilled in the art are intended to be included within the scope of the claims.

What is claimed is:

1. A method for the preparation of an electrically conductive polymer material containing a polyaniline or derivative thereof doped with a polymer-doping protonic acid, a metal compound, and a neutralizing compound comprising:

(a) contacting a polyaniline or a derivative thereof, said polymer-doping protonic acid, a metal precursor compound, an acid capable of reacting with said metal precursor compound to form a second metal compound and which may be the same as, or different from, said polymer-doping protonic acid, a neutralizing compound different from said metal precursor compound and from said second metal compound and selected from the group consisting of $CaCO_3$, $Na_2CO_3$, $NaHCO_3$, $MgCO_3$, $SrCO_3$, $MnCO_3$, $KHCO_3$, borax, and mixtures thereof, and an optional plasticizing agent selected from the group consisting of water, alcohols, ethers, ketones, phenols, amines, esters, fluorinated carboxylic acids, fluorinated sulfonic acids, amides, and phosphoramides; and (b) heat treating this mixture at a temperature of 50° C. to 400° C., whereby said metal precursor compound and said acid capable of reacting with said metal precursor compound react to form said second metal compound.

2. The method according to claim 1, wherein said contacting is carried out in a melt mixer.

3. The method according to claim 1, wherein said protonic acid is a sulfonic acid or a derivative thereof; said metal precursor compound is a zinc compound; said acid capable of reacting with said metal precursor compound to form a second metal compound is the same as said protonic acid; and said neutralizing compound is calcium carbonate.

4. A method for preparing an electrically conductive plastics mixture comprising combining an electrically conductive polymer material prepared according to the method of claim 1, with an insulating polymer matrix in a melt mixing device at a temperature of 80° C. to 350° C.

5. The method according to claim 1, wherein said temperature is from 80° to 300° C.

6. The method according to claim 5, wherein said temperature is from 100° to 200° C.

7. The method according to claim 2, wherein said melt mixer is selected from the group consisting of a screw mixer and a compounder.

8. A method for the preparation of a processable conductive polymer material containing a polyaniline or a derivative thereof and a protonic doping acid, comprising the following steps:

(a) producing a mixture which comprises 1–20 wt. % polyaniline or its derivative, 50–90 wt. % of said protonic doping acid, calculated as dodecylbenzene sulfonic acid, and 1–45 wt. % of a plasticizing component selected from the group consisting of water, a $C_1$–$C_3$ alcohol, and mixtures thereof to form a mixture;

(b) feeding the mixture obtained from step (a) into a melt-mixing apparatus, and subjecting said mixture to shear forces at a temperature of 50°–400° C. to obtain a blend;

(c) recovering the blend obtained from step (b) from the melt-mixing apparatus; and (d) optionally posttreating the blend recovered in step (c), wherein step (a) or step (c) further comprises adding a metal compound capable of reacting with a protonic acid and a neutralizing compound different from said metal precursor compound and from said second metal compound and selected from the group consisting of $CaCO_3$, $Na_2CO_3$, $NaHCO_3$, $MgCO_3$, $SrCO_3$, $MnCO_3$, $KHCO_3$, borax, and mixtures thereof.

9. The method according to claim 8, wherein the polyaniline or derivative thereof in the mixture produced in step (a) is in the emeraldine base form.

10. The method according to claim 8, wherein the mixture produced in step (a) contains 4–10 wt. % polyaniline or a derivative thereof.

11. The method according to claim 8, wherein the protonic doping acid is an organic sulfonic acid or a derivative thereof.

12. The method according to claim 11, wherein the organic sulfonic acid is dodecylbenzene sulfonic acid.

13. The method according to claim 8, wherein the mixture obtained in step (a) contains 60–85 wt. % protonic doping acid, calculated as dodecylbenzene sulfonic acid.

14. The method according to claim 8, wherein the plasticizing component is selected from the group consisting of water, methanol, ethanol, and mixtures thereof.

15. The method according to claim 14, wherein the plasticizing agent is water.

16. The method according to claim 8, wherein the mixture produced in step (a) contains 1–35 wt. %, of the plasticizing component.

17. The method according to claim 16, wherein the mixture produced in step (a) contains 5–20 wt. % of the plasticizing component.

18. The method according to claim 8, wherein said protonic acid is the protonic doping acid.

19. The method according to claim 8, wherein the metal compound is a zinc compound.

20. The method according to claim 19, wherein the zinc compound is zinc oxide.

21. The method according to claim 8, wherein the amount of metal compound is 3–10 wt. %, based on the combined weight of said metal compound and the other components added in step (a).

22. The method according to claim 8, wherein step (a) or step (c) further comprises adding a neutralizing compound.

23. The method according to claim 22, wherein said neutralizing compound is calcium carbonate.

24. The method according to claim 22, wherein the amount of neutralizing compound is 0.1–8 wt. %, based on the combined weight of said neutralizing compound and the other components added in step (a).

25. The method according to claim 24, wherein the amount of neutralizing compound is 0.5–2 wt. %.

26. The method according claim 8, wherein step (a) comprises:

(i) first producing a polyaniline or derivative thereof comprising water or a $C_1$–$C_3$ alcohol in an amount of 1–70 wt. %;

(ii) mixing a protonic doping acid into the polyaniline or derivative thereof obtained from step (i); and (iii) optionally adding water or $C_1$–$C_3$ alcohol to the mixture obtained from step (ii).

27. The process according to claim 26, wherein step (i) comprises polymerizing a monomer of the polyaniline or its derivative in the presence of said water or alcohol.

28. The method according to claim 26, wherein step (iii) further comprises adding a metal compound capable of reacting with the protonic doping acid to the mixture obtained from step (ii).

29. The method according to claim 28, wherein said metal compound is zinc oxide.

30. The method according to claim 26, wherein step (iii) further comprises adding a neutralizing compound to the mixture obtained from step (ii).

31. The method according to claim 30, wherein said neutralizing compound is calcium carbonate.

32. The method according to claim 8, wherein step (a) or step (c) further comprise adding a thermoplast.

33. The method according to claim 8, wherein the thermoplast is selected from the group consisting of a homo- or copolymer based on an olefin; a homo- or copolymer based on styrene or a derivative thereof; a vinyl polymer or vinyl copolymer; an acrylic homopolymer or acrylic copolymer; a thermoplastic condensation polymer; and mixtures of these.

34. The method according to claim 32, wherein the proportion of the thermoplast is approximately 55–99 wt. %, of the total amount of the thermoplast and the other components added in step (a).

35. The method according to claim 34, wherein the proportion of thermplast is approximately 70–95 wt. %.

36. The method according to claim 8, wherein the mixing in step (b) is carried out using a kneader, a compounder, a screw mixer, or a roll mixer.

37. The method according to claim 8, wherein the mixing in step (b) is carried out at a temperature of 80°–300° C.

38. The method according to claim 37, wherein said temperature is 100°–200° C.

39. The method according to claim 8, wherein step (d) comprises feeding the blend recovered in step (c) into a mixing apparatus and mixing it by means of shear forces at a temperature of 80°–350° C.

40. A method for preparing a processable, electrically conductive polymer material comprising:

(a) contacting a polyaniline or its derivative, with a first protonic doping acid, with a second protonic acid, with a metal precursor compound capable of reacting with said second protonic acid, which may be the same as said first protonic acid, to form a second metal compound, and with a neutralizing compound different from said metal precursor compound and from said second metal compound and selected from the group consisting of $CaCO_3$, $Na_2CO_3$, $NaHCO_3$, $MgCO_3$, $SrCO_3$, $MnCO_3$, $KHCO_3$, borax, and mixtures thereof, and a plasticizing component selected from the group consisting of water, a $C_1$–$C_3$ alcohol, and mixtures thereof, to form a mixture;

(b) feeding said mixture into a melt-mixing apparatus and mixing it by shear forces at a temperature of from 50° to 400° C. to obtain a blend, whereby said second protonic acid reacts with said metal precursor compound to form a second metal compound; and (c) recovering said blend from the melt-mixing apparatus.

* * * * *